(12) United States Patent
Wörner et al.

(10) Patent No.: US 6,170,353 B1
(45) Date of Patent: Jan. 9, 2001

(54) SELECTION SYSTEM FOR AN AUTOMATIC MOTOR VEHICLE TRANSMISSION

(75) Inventors: Günter Wörner, Kernen; Hartmut Gösele, Neubulach; Paul Weiss, Ostfildern, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/300,518

(22) Filed: Apr. 28, 1999

(30) Foreign Application Priority Data

Apr. 28, 1998 (DE) .............................................. 198 18 864

(51) Int. Cl.⁷ .............................. B60K 20/00; G05G 5/00
(52) U.S. Cl. ......................................................... 74/473.21
(58) Field of Search ..................... 192/220.4; 74/473.21, 74/473.22, 473.23, 520

(56) References Cited

U.S. PATENT DOCUMENTS

| | | | | |
|---|---|---|---|---|
| 2,745,526 | * | 5/1956 | Saives ................................ | 74/473.22 |
| 3,710,904 | * | 1/1973 | Boyer et al. ................... | 74/473.22 X |
| 3,857,298 | * | 12/1974 | Case et al. ..................... | 74/473.21 X |
| 4,398,433 | * | 8/1983 | Sonns .............................. | 74/473.21 X |
| 5,588,934 | * | 12/1996 | Osborn et al. ................. | 74/473.21 X |
| 5,878,623 | * | 3/1999 | Teich .............................. | 74/473.21 X |
| 6,009,769 | * | 1/2000 | Ikegami ............................. | 74/473.23 |
| 6,092,435 | * | 7/2000 | Paparoni ........................ | 74/473.21 X |

FOREIGN PATENT DOCUMENTS

| | | |
|---|---|---|
| 196 41 706 | 3/1998 | (DE) . |
| 0625656 A1 | 5/1994 | (EP) . |
| 0 709 597 | 5/1996 | (EP) . |

\* cited by examiner

*Primary Examiner*—Lenard A. Footland
*Assistant Examiner*—Colby Hansen
(74) *Attorney, Agent, or Firm*—Evenson, McKeown, Edwards & Lenahan, P.L.L.C.

(57) ABSTRACT

A selection system for an automatic motor vehicle transmission has locking system in which a toggle lever arrangement is connected with the selector element and is arranged to be movable thereby relative to a locking body. The locking body is arranged to be movable into the moving path of the toggle lever arrangement into a locking position which locks it and out of this moving path into an unlocking position which does not lock it and can be driven by the actuator arrangement for carrying out its movements. As a result, the selection system can be securely unlocked also by low forces of an actuator arrangement.

16 Claims, 6 Drawing Sheets

SELECTION SYSTEM FOR AN AUTOMATIC MOTOR VEHICLE TRANSMISSION

CROSS-REFERENCE TO RELATED APPLICATIONS

This application is related to two concurrently filed applications, Ser. No. 09/300,524 and 09/300,525, filed Apr. 28, 1999, respectively, in the name of Günter Wörner et al. for Selection System For An Automatic Motor Vehicle Transmission; based upon German applications 198 18 866.8-14 and 198 18 863.314, filed in Germany on Apr. 28, 1998, the subject matter of which is incorporated herein by reference.

BACKGROUND OF THE INVENTION

This application claims the priority of 198 18 864.1, filed Apr. 28, 1998, the disclosure of which is expressly incorporated by reference herein.

The present invention relates to a selection system for an automatic motor vehicle transmission and more particularly, to a selection section having a manual selector element arranged to be manually adjusted to different positions for selecting transmission adjustments, and a locking device having a controllable actuator arrangement for automatic locking and unlocking of the selector element in at least one defined position as a function of defined operating conditions.

The invention relates to all types of automatic transmissions, particularly, fully automatic and partially automatic gear boxes. In addition, so-called automatic converter step mechanisms and variable transmissions with infinitely variable transmission ratios with or without gears are also contemplated.

In vehicles with automatic transmissions, a selector element, usually a selector lever, is provided for selecting a desired transmission adjustment. The selector lever can be adjusted to different positions, such as a parking position P, a reversing position R, a neutral position or engine idling position N, a normal forward driving position D with an automatically variable transmission ratio and optionally also one or several forward driving positions with an invariable transmission ratio.

The known selector lever is combined with a so-called shiftlock function, via which the release of the selector lever from the parking position P is possible only when certain operating conditions are fulfilled, e.g., when the ignition key of the vehicle has been operated in the ignition lock (for example, the ignition was switched on) and the brake pedal is also depressed. It happens frequently in normal operation that, although the ignition is initiated, the driver forgets to depress the braking pedal so that a manual operating force is exercised on the selector lever, while the selector lever is still locked in the parking position P.

In a selection system, as described, for example, in DE-196 41 706 C1, when the brake is operated only subsequently, a solenoid can no longer release the lock for the following reasons. The manual force entered by the driver into the selection system is transmitted to a cam disk. The cam disk is held by a locking lever in a locking contour of the cam disk in the parking position P as long as, by way of a solenoid, an auxiliary force is not transmitted to the lever such that the locked engagement of the locking lever on the locking contour is released.

Because of the mechanical connection of the elements, the releasing force is proportional to the manual force on the selector lever. Consequently, starting from a defined manual force, the solenoid will no longer be strong enough to overcome the locking forces, particularly the frictional forces generated by the manual force and to release the engagement of the locking lever in the locking contour. This condition will exist when the manual introduction of force takes place at the selector lever before the ignition key has been operated and/or before the brake is operated. The brake must be operated before and while a manual force is exercised on the selector lever.

Although changes of the limit value of the release force between the locking lever and the locking cam are possible in small amounts, the locking kinematics and the capacity of the solenoid are restricted to space-related parameters. Because of the limited space and also because the heat generates, the solenoid cannot be arbitrarily enlarged. A further locking contour in the cam disk, forms a second lock in combination with the locking lever. As a function of the driving speed in the forward drive, a manual engagement of the reverse gear is prevented as long as the driving speed is above a defined limit value of, for example, 8 km/h. The locking lever is loaded by spring devices in a direction opposed to the solenoid and, when the solenoid is switched off, is moved back into the opposite direction.

EP 0 709 597 A1 describes a selection system which has a locking arrangement in which a toggle lever operated by a solenoid blocks the manual operation of the locking element in the extended position.

SUMMARY OF THE INVENTION

An object of the present invention is to be able to securely lock and unlock a selector element of a selection system without the requirement of larger and higher-powered control elements as previously required also when a manual operating force is exercised on the selector element before the operating conditions exist which are required for unlocking the selector element.

According to the invention, this object is achieved by providing that the locking device contains a toggler lever arrangement which, by means of one end away from its toggle link, is swivellably connected with the selector element and can be moved by it relative to a locking body and, by means of its other end, is stationarily swivellably arranged. The locking body is arranged to be movable into the moving path of the toggle lever arrangement into a locking position which locks it in and out of moving path, into an unlocking position which does not lock it, and can be driven by the actuator arrangement for carrying out its movements.

The operating condition as a function of which the selector element is locked or unlocked, in addition to the operation of the ignition key and of the brake, can also include the driver's proof of an authorization to drive which must first be reported to an electronic control unit of the vehicle before a start of the vehicle can be initiated. Furthermore, the function of a drive-away lock, a so-called "break-lock" may be integrated in the selection system; i.e. a rotating block of the drive transmission line in the parking position P of the selector element as a safety device, particularly a child safety device, against an unintentional moving of the vehicle by adjusting the is selector element from the parking position P into another position R, N. D, etc.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

In the embodiments of a selection system according to the present invention described below wherein the several embodiments like parts are designated by the same numeral, because of the selected toggle lever principle, the force between locking surfaces of the toggle lever arrangement and a locking body resulting from a manual force on the selector lever is zero or at least several times lower than the driver's manual force on the selector element. As a result, a relatively low force of a control element means that the locking body can also be "torn away" from the toggle lever arrangement and be moved into an unlocked position if the driver operates the vehicle brake only after the application of a manual force to the selector element.

The selector element may be a slide or a swivellably disposed lever. The present invention is not limited to toggle lever arrangement for the transmissions adjustments P, R, N and D mentioned below but can also be used for any other transmission adjustment.

Figure 1:
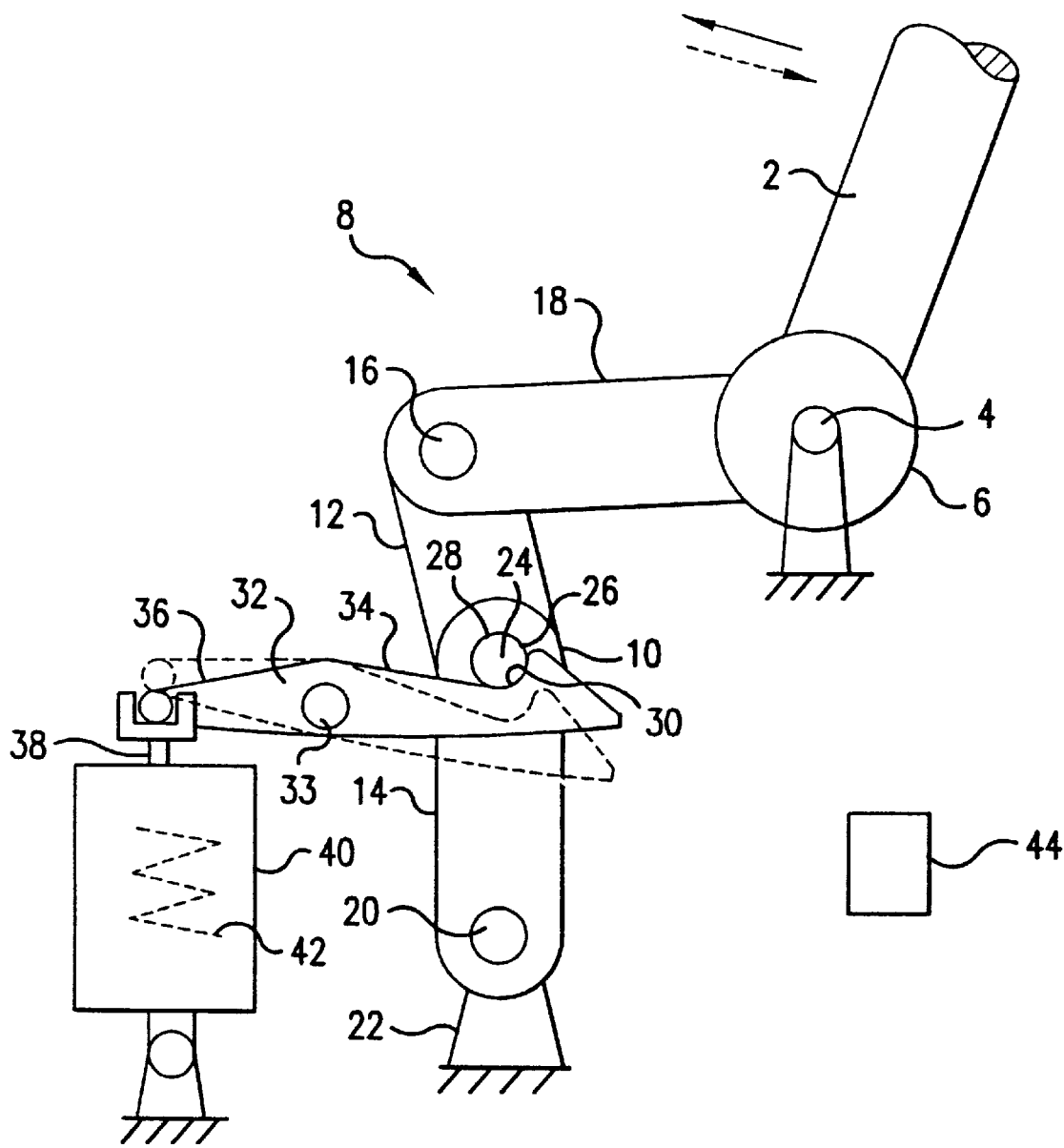
FIG. 1 is a schematic elevational view of the selection system according to the present invention indicated by solid lines in the locked engaged position and by broken lines in the unlocked disengaged position.

The selection system of FIG. 1 contains a selector lever 2 which can be adjusted about a rotation axis 4, which may simultaneously be the axis of a transmission shifting shaft 6, from a starting position, for example, a parking position P, into other positions. For example, the selector lever 2 is manually swivellable by the driver by way of a reversing position R and then by way of an engine idling position or neutral position N, into a normal forward driving position D and optionally beyond the latter into other forward driving positions.

A toggle lever arrangement 8 contains a toggle link 10 which is formed between two levers or legs 12, 14. At its end away from the toggle link 10, one leg 12 is swivellably connected by way of a movable rotation axis 16 with a lever or arm 18 of the selector lever 2. The arm 18 is arranged transversely to the selector lever 2 and its rotation axis 4 and, at its end away from the movable rotation axis 16, is rigidly connected with the selector lever 2 so that, together therewith, it can be swivelled about the selector lever rotation axis 4.

The end of the other toggle lever arm 14 away from the toggle link 10 is swivellably fastened in a bearing 22 by way of a stationary rotation axis 20, which bearing is stationarily arranged in a housing. The rotation axis of the toggle link is formed by a shaft 26 whose surface forms a bent-lever locking surface 28 beside the toggle lever legs 12, 14 which is in a locked engaged position (illustrated by solid lines) on a locking surface 30 of a detent pawl 32 when the selector lever 2 is in the parking position P.

The detent pawl 32 extends in a plane parallel to the moving plane of the toggle lever arrangement 8. The detent pawl 32 is a two-armed lever which is swivellably disposed about a rotation axis 33 and on whose one lever arm 34, the detent pawl locking surface 30 is formed, and to whose other lever arm 36, the armature 38 of a solenoid 40 is applied. The armature 38 and the detent pawl 32 connected therewith are held in the locked position illustrated in FIG. 1 by solid lines by a positioning spring 42 (pressure spring or tension spring according to the arrangement) when the solenoid 40 is switched off (without electric current). This function is called a P-lock because the selector lever cannot be adjusted manually from the parking position P into another position.

The solenoid 40 is switched on as a function of operating conditions, for example, as a function of whether the ignition key was operated in the ignition lock and the brake pedal is depressed and, if desired, also as a function of whether a driver has proven an authorization to drive by an identification device. If these operating conditions exist, the solenoid 40 is automatically switched on by an electronic control unit 44 (energized, that is, supplied with current). The energized solenoid 40 pushes the armature 38 against the spring force of the positioning spring 42 a distance out of the solenoid 40 so that it rotates the detent pawl 32 about the detent pawl rotation axis 44 into the position illustrated by a broken line in FIG. 1.

Then, the detent pawl 32 releases the toggle link 10 which can be moved by the selector lever 2 from the slightly bent position illustrated in FIG. 1 into more bent positions, in which the toggle link shaft 26 is moved by the selector lever 2 into the positions R, N or D illustrated by broken lines when the selector lever 2 is moved from the parking position P into the reversing position R or beyond the latter into the neutral position N or the normal forward driving position D.

When the selector lever is in an intermediate position situated between the parking position P and the reversing position R, the toggle link shaft 26 can no longer arrive in a locked engaged position behind the detent pawl locking surface 30. The solenoid 40 is automatically switched off by the electronic control unit 44. Consequently, the positioning spring 42 swivels the detent pawl 32 from its unlocked position (illustrated by broken lines) back into its locked position (illustrated by solid lines).

When the selector lever 2 is now moved back into the parking position P and, as a result, the toggle link locking surface 28 is engaged again with the detent pawl locking surface 30, the selector lever 2 can only be moved from P to R again when the vehicle brake is depressed and the ignition key is still in the defined position in the lock. The toggle link 10 will then have a "bent position", as illustrated in FIG. 1, when the two theoretical connection lines from the toggle link rotation axis 24 to the two other rotation axes 16, 20 of the legs 12, 14 are not arranged on a straight line with respect to one another but at an angle of less than 180° with respect to one another. The toggle link 10 is slightly bent in the direction in which it is to be bent further by the selector lever 2 when it is disengaged from the detent pawl 32. In FIG. 1, the toggle link 10 is bent toward the right when, starting from the parking position P, the selector lever 2 is swivelled counterclockwise to the left.

When the two toggle lever legs 12, 14 are in the extended position, i.e., their three rotation axes 16, 24 and 20 are situated on a straight line, a manual force on the selector lever 2 does not generate a bearing force in the toggle link 10 which is directed transversely to the toggle lever legs 12, 14. Thus, the transverse force generated at the toggle link 10, resulting from a manual force at the selector lever 2, becomes larger as the angle between the two toggle lever legs 12, 14 becomes smaller. By using such a toggle lever principle, the solenoid 40, while the electromagnetic power is the same, can even still unlock the parking position P of the selector lever 2 if a manual operating force which is four to five times larger is exercised on the selector lever 2 already before the solenoid is switched on; e.g., because the driver depresses the brake only after already exercising a manual force on the selector lever 2. As a result, the above-mentioned task is achieved in a simple manner.

Figure 2:
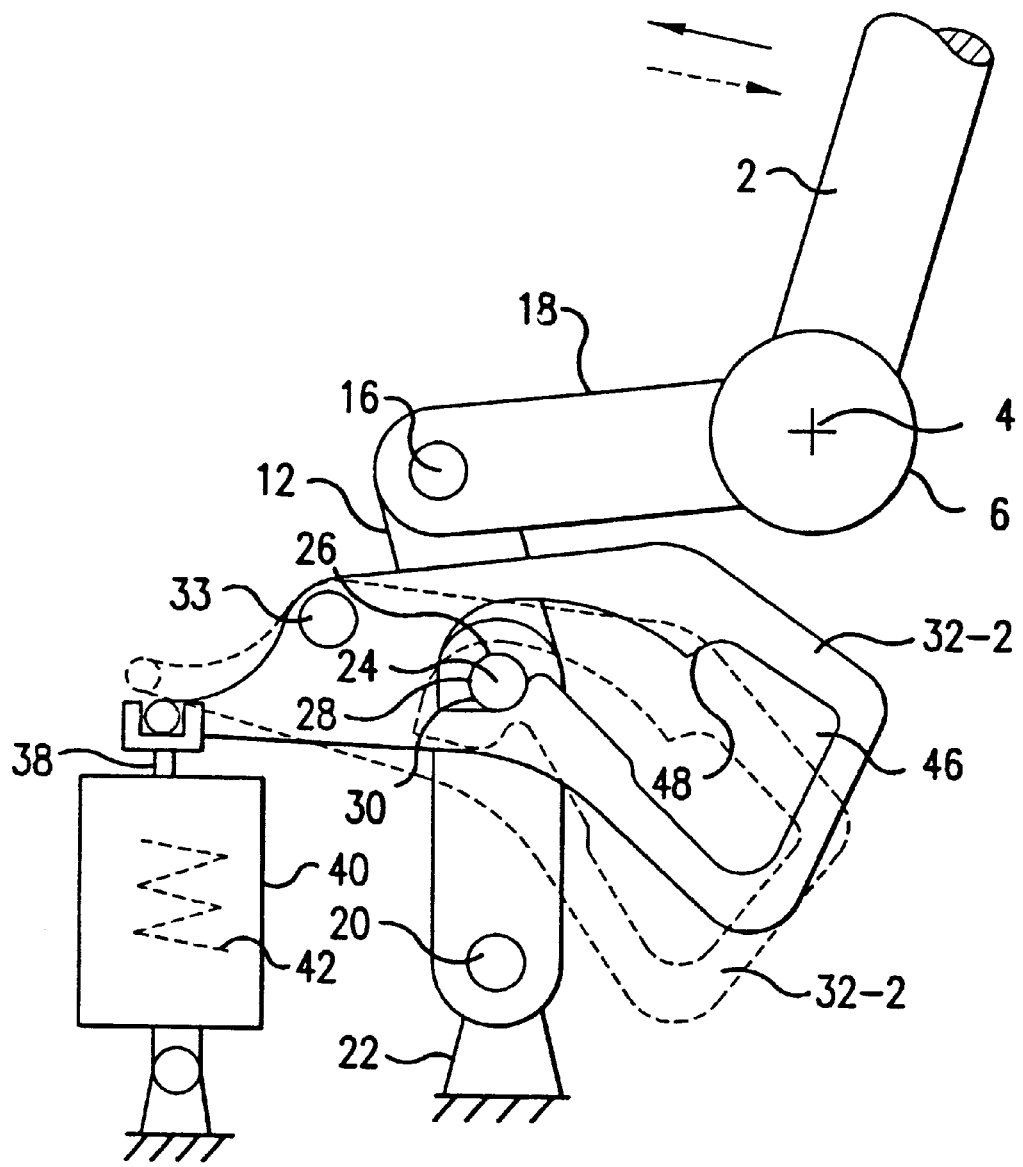
FIG. 2 is a schematic view similar to FIG. 1 but of another embodiment of a selection system according to the present invention indicated by solid lines in the locked engaged position in the parking position P(P-lock) and by broken lines in an unlocked disengaged position.
Figure 3:
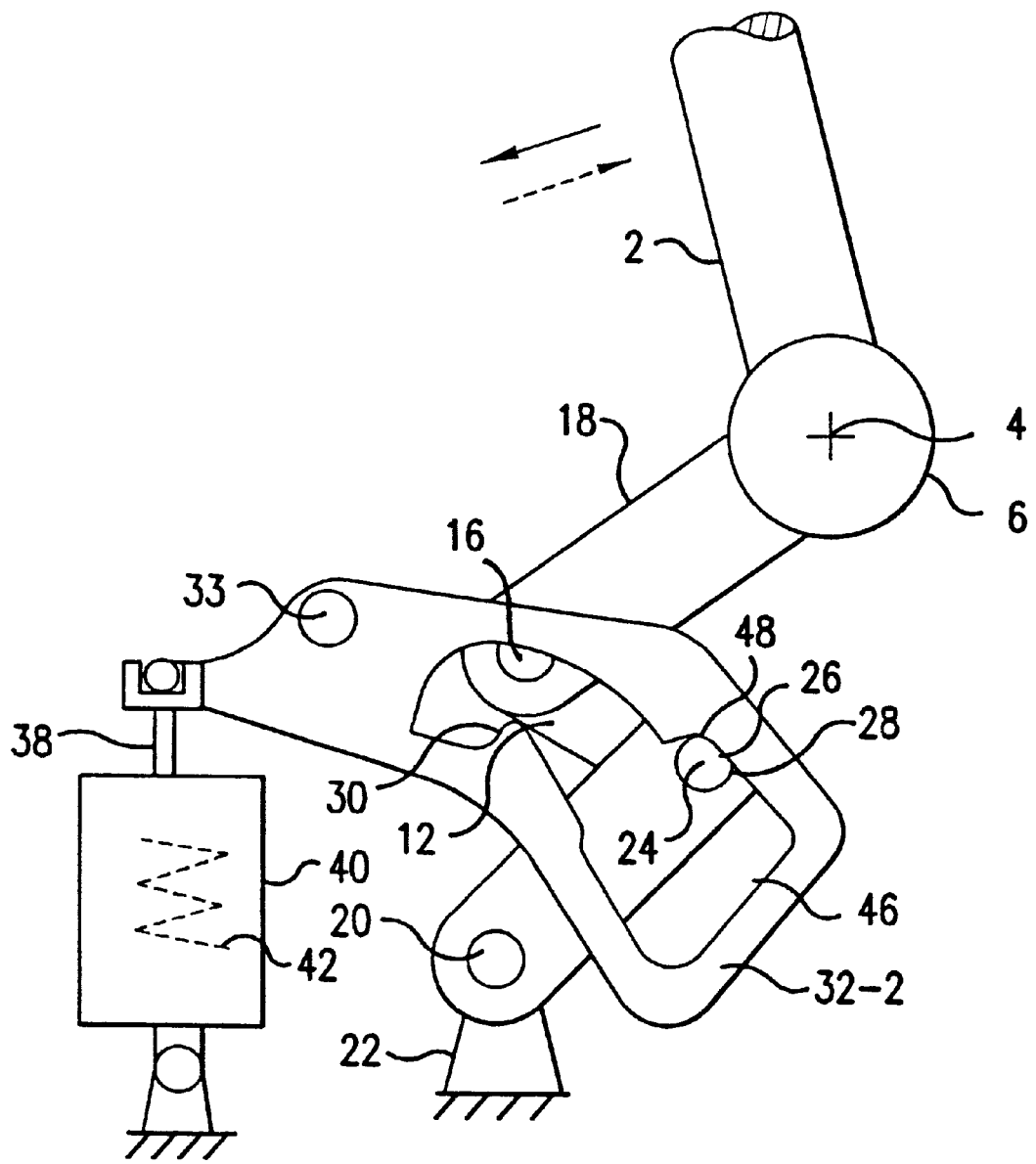
FIG. 3 is a view of the selection system of FIG. 2 but in a second locked engaged position in the neutral position N (R-lock)

Another embodiment of a selection system according to the invention illustrated in FIGS. 2 and 3 differs from the embodiment of FIG. 1 only in that a detent pawl 32-2 has a locking gate window 46 in which, in addition to one locking surface 30, a second locking surface 48 is formed on which the locking surface 28 of the toggle link 10 can be brought into a locked engaged position as illustrated in FIG. 3. The two locking surfaces 30, 48 of the locking pawl 32-2 constructed as cams or pawls are arranged in opposite directions and, in the toggle link moving direction, are arranged at a distance from one another on mutually opposite edges of the locking gate window 46.

All rotation axes 4, 16, 20, 24 and 44 are arranged in parallel to one another. The detent pawl 32-2 extends in a plane which is parallel to the moving plane of the toggle link 10. One locking surface 30 of the detent pawl 32-2 is pushed by the positioning spring 42 into an engaged position which locks the toggle link 10 and, when the solenoid 40 is switched on, can be moved thereby against the spring force into an unlocked position, as described also with respect to FIG. 1. The other locking surface 48 of the detent pawl 32-2 is pushed by the positioning spring 42 into the disengaged position not locking the toggle link 10 and, by switching on the solenoid 40, can be moved thereby against the spring force into an engaged position locking the toggle link 10 when the selector lever 2 is in the neutral position N, preferably also when it is in the normal forward driving position D.

The solenoid 40 is always switched on by the electronic control unit 44 when the vehicle speed exceeds a limit value, for example, is higher than 8 km/h. This is also called an "R-lock" because it blocks a shifting-back of the selector lever 2 from the neutral position N into the reversing position R. As soon as the vehicle speed falls below the limit value, the electronic control unit 44 automatically switches off the solenoid 40 again so that then the spring 42 swivels the detent pawl 32-2 back into the position illustrated by solid lines in FIG. 2. The broken lines in FIG. 2 show the swivelling position of the detent pawl 32-2 which is illustrated by solid lines in FIG. 3.

Figure 4:
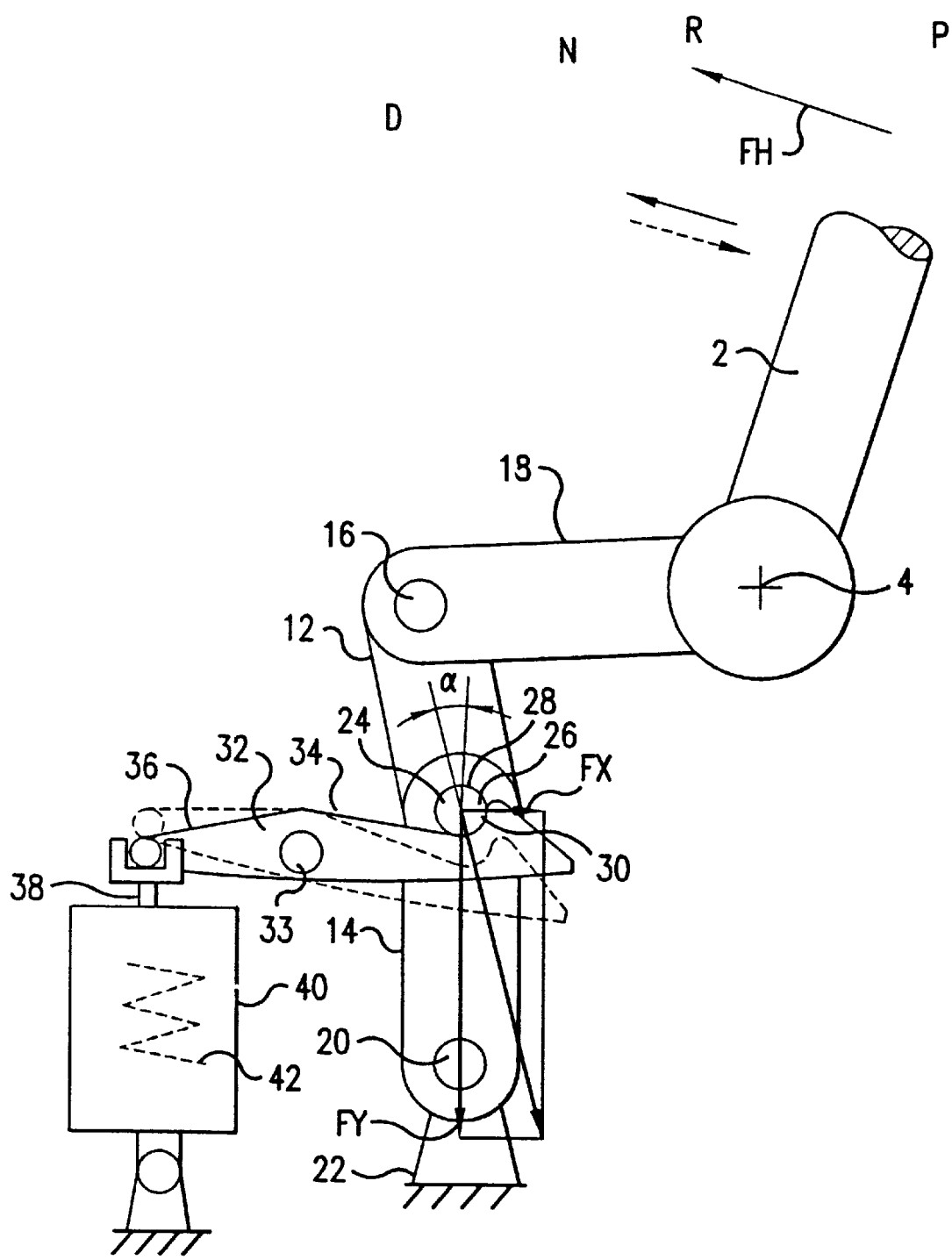
FIG. 4 is a view of the selection system of FIG. 1 but with an additionally outlined parallelogram of forces.

FIG. 4 shows a parallelogram of forces of the embodiment of FIG. 1. In their starting position, which corresponds to the parking position P, the two toggle lever legs 12, 14 are slightly bent or skewed at an angle a out of their extended position and are thus arranged relative to one another at an angle of slightly less than 180°. A large manual force FH on the selector lever 2 is seen to be predominantly absorbed by the stationary bearing 22 of the lower lever arm 14 illustrated by an arrow FY, and only a small portion of this manual force FH between the mutually contacting locking surfaces 28, 30, illustrated by an arrow FX. As a result, for the unlocking movement of the detent pawl 32 of FIG. 1 and correspondingly also of the detent pawl 32-2 of FIGS. 2 and 3, the solenoid 40 must apply only a low operating power which corresponds to the low resulting force FX.

The unlocking force to be generated by the positioning spring 42 is also correspondingly low in order to tear the toggle lever locking surface 28 away from the other detent pawl locking surface 48 so that the toggle link 10 can be moved from the locking position in FIG. 3 back past the locking surface 48. Such a tearing-off force must be generated only if, from the unlocking movement, the driver generates a manual force at the selector lever 2 in the direction from N to R and P.

Figure 5:
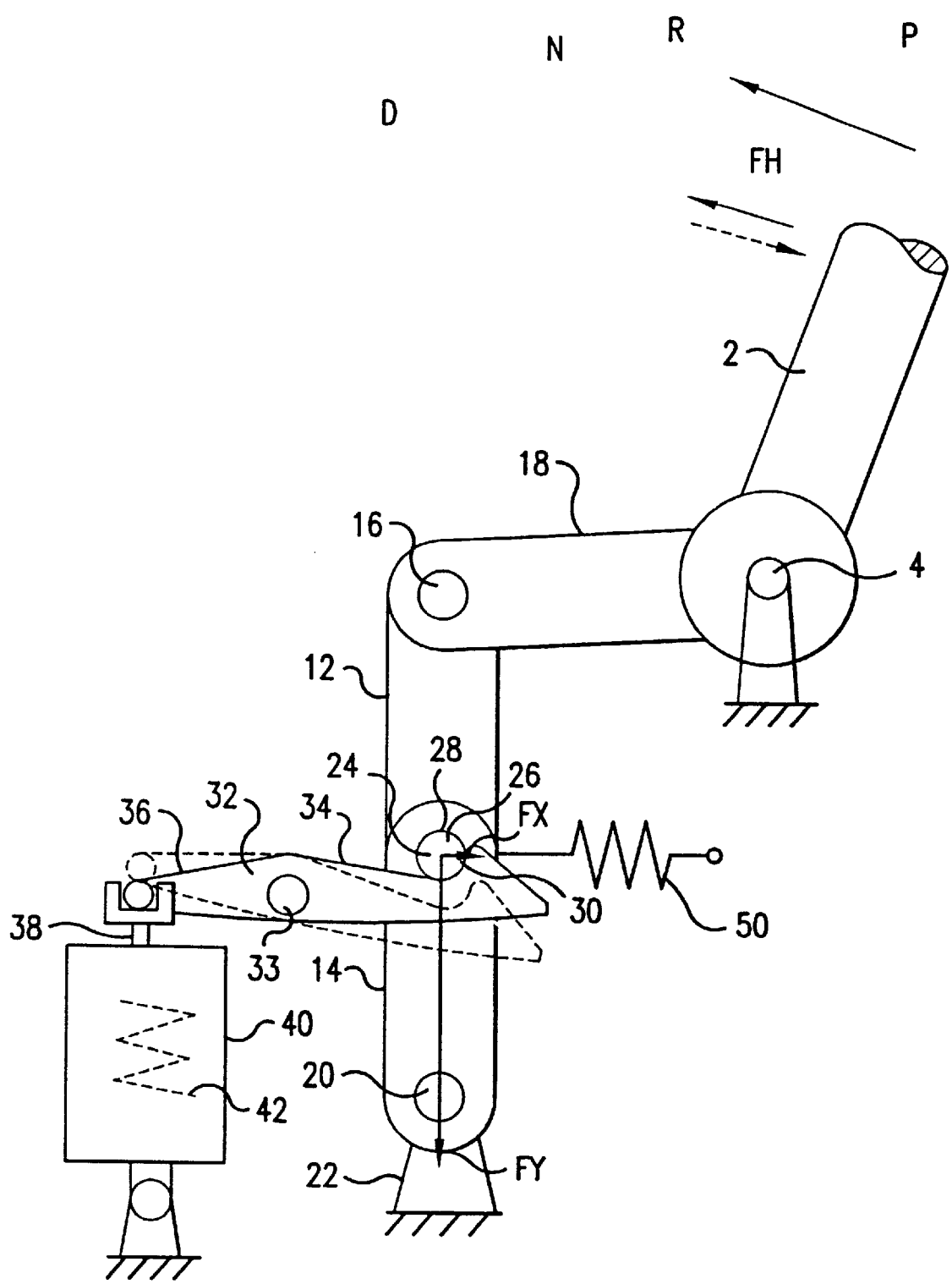
FIG. 5 is a schematic side view of another embodiment of a selection system according to the present invention, in which, in contrast to the similar embodiment of FIG. 1, the two legs of a toggle link, in the locked engaged position, are arranged at an angle 180° extended with respect to one another so that an auxiliary force is required for the initial bending of the toggle link.

FIG. 5 shows an embodiment which is similar to FIG. 1, but the two toggle lever legs 12, 14 are arranged in the starting position, which corresponds to the parking position P of the selector lever 2, in a straight line or extended with respect to one another, with their three rotation axes 16, 24 and 20 being situated on a straight line. The selector lever 2 can generate no transverse force in the toggle link 10, but all its manual force FN corresponding to the illustrated force arrow FY through the rotation axes 16, 24 and 20 is absorbed by the stationary bearing 22. Therefore, an auxiliary force FH, for example, by way of an auxiliary spring 50 acting onto the toggle link 10, must be exercised on the toggle link 10 at least so long in the direction in which it is to be bent during a movement of the selector lever 2 until the toggle link 10 is bent so far that a sufficient transverse force FX is generated in it from the manual force FH of the selector lever 2. Such an embodiment has the advantage that, in the locking position, the mutually contacting locking surfaces 28, 30 are completely free of manual transverse forces and, as a result, for moving these locking surfaces into their unlocked position, the solenoid 40 needs to overcome no significant frictional forces.

Selection systems also exist in which the selector lever end facing away from the rotation axis 4 of the selector lever 2 cannot be swivelled in a straight line in the longitudinal direction of the vehicle about a selector lever rotation axis 4 into the various selector lever positions, but must also carry out transverse movements in the transverse direction of the vehicle in order to be able to arrive in one or the other selection position. It can, for example, be provided that, from the parking position, the selector lever 2 must first carry out a transverse movement longitudinally to the selector lever rotation axis 4 before it can be rotated in the direction of the other positions about the selector lever rotation axis. The toggle lever locking arrangement can operate in the described manner on the transverse moving path of the selector lever 2.

Special additional embodiments will be described in the following with respect to FIGS. 6 to 9. They show the selector lever 2 also in a guiding gate 58 which is arranged above the toggle lever arrangement and above the transmission shifting shaft 6. The selector lever 2 must be swivelled from the parking position P first about a rotation axis 60 extending at a right angle through the rotation axis of the transmission shifting shaft 6 before it can be swivelled in the longitudinal direction of the vehicle about the shifting shaft rotation axis 4 to the other positions R. N and D. A fork head 62 and a transverse shaft 64 extending at a right angle through the shifting shaft 6 rotatably dispose the selector lever 2 in the shifting shaft 6.

The toggle lever arrangement 8 is arranged such that it is not operative, as in the previously described embodiments, in the longitudinal direction of the vehicle, but in the transverse direction of the vehicle while the selector lever 2 carries out rotations about its transverse rotation axis 60. The stationary bearing 22 is not fastened to a housing but to the shifting shaft 6 so that the entire toggle lever arrangement 8, together with the selector lever 2, can swivel about the shifting shaft axis of rotation 4.

Figure 6:
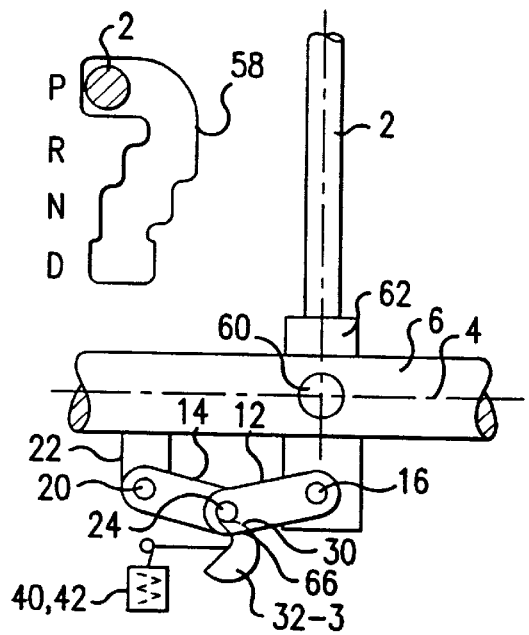
FIG. 6 is a side view but rotated by 90° about a selector lever longitudinal axis with respect to the embodiments of FIGS. 1 to 5 of another embodiment of a selection system according to the invention in a locked engaged position in the parking position P (P-lock)
Figure 7:
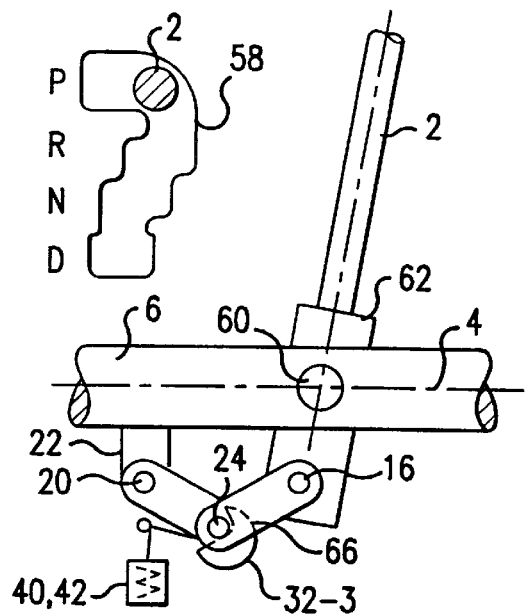
FIG. 7 is a view of the selection system of FIG. 6, but with the R-lock being unlocked and the selector lever being in a laterally displaced intermediate position situated between the parking position P and a reversing position R.

As the locking body, a detent pawl 32 or 32-2 according to the preceding constructions can be used again or the locking shaft 32-3 illustrated in FIGS. 6 and 7. It can be arranged to be stationary or to be rotatable with the shifting shaft 6.

In the parking position P of the selector lever 2 illustrated in FIG. 6, a pawl or a stop cam 66 of the locking shaft 32-3 is situated below the toggle link shaft 26 so that it rests against an outer locking surface 30 of the stop cam 66 and blocks a transverse movement of the selector lever 2 from the parking position P into the transverse position displaced to the right and illustrated in FIG. 7. When the solenoid 40 is switched on and the corresponding operating conditions exist, the solenoid 40 rotates the locking shaft 32-3 clockwise into the unlocked disengaged position illustrated in FIG. 7. The stop cam 66 arrives in a position on the right beside the toggle link shaft 26 in which the toggle link 10 is free to move downwards. As a result, the selector lever 2 can now be swivelled from the parking position P about the transverse rotation axis 60 into the transverse position displaced to the right. This releases the P-lock. After the solenoid 40 is switched off, the positioning spring 42 can rotate the locking shaft 32-3 back into the rotating position of FIG. 6.

Figure 8:
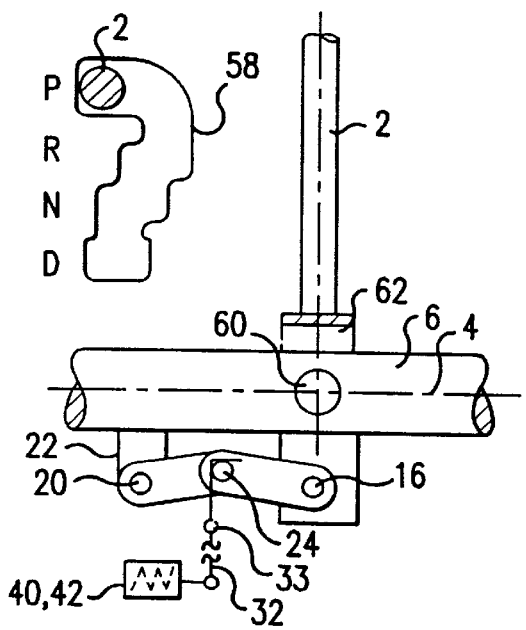
FIG. 8 is a side view of yet another embodiment of the selection system according to the present invention with a selector lever in the parking position P and a toggle lever arrangement with a detent pawl in the locked engaged position.
Figure 9:
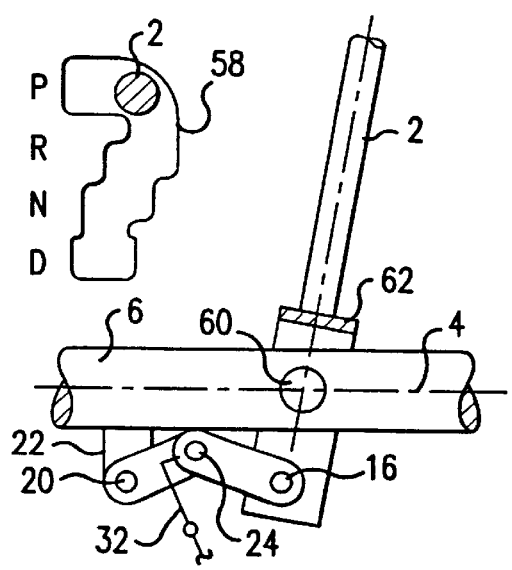
FIG. 9 is a view of the selection system of FIG. 8 but in the unlocked disengaged position.

The embodiment shown in FIGS. 8 and 9 operates in the same manner as the embodiment according to FIGS. 6 and 7, except that the toggle link 10 is not deflected downward away from the shifting shaft 6 but upwards toward the shifting shaft 6. In addition, instead of the locking shaft 32-3, a swivellably disposed detent pawl 32 is provided which, in the parking position P of the selector lever 2 illustrated in FIG. 8, prevents the toggle link from being deflected in the upward direction. As a result, the selector lever 2 is locked in the parking position P.

The switching-on of the solenoid 42 causes the detent pawl 32 as shown in FIG. 9 to release the toggle link 10 so that it can be moved upwards in the direction of the shifting shaft 6. Consequently, the selector lever 2 can be moved from the parking position P about the transverse rotation axis 60 transversely to the longitudinal direction of the vehicle into the transverse position. Here, the selector lever 2 can be swivelled in the longitudinal direction of the vehicle about the shifting shaft axis 4 into the other positions R, N and D as well as back again.

In the embodiments according to FIGS. 6 to 9, a locking function corresponding to the parking position P can be provided instead or in addition also in the case of one of the other positions of the selector element, particularly as an R-lock in the neutral position N. In FIGS. 6 to 9, the toggle lever arrangement 8 and the detent pawls 32 and 32-2 of FIGS. 1 to 5 can additionally be used for the positions P, R, N, D in the moving direction of the selector lever 2 about the selector lever rotation axis 4 in the longitudinal direction of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selection system for an automatic motor vehicle transmission, comprising a manual selector element arranged to be manually adjusted to different positions for selecting transmission adjustments, and a locking device having a controllable actuator arrangement for automatic locking and unlocking of the selector element in at least one defined position as a function of defined operating conditions, wherein the locking device contains a toggle lever arrangement which, has a toggle link having one end that is is swivellably connected with the selector element and is movable thereby relative to a locking body and also has another end that, is swivellably arranged around a stationary axis and the locking body is movably arranged into a moving path of the toggle lever arrangement into a locking position and out of the moving path, into an unlocking position and is driveable by the actuator arrangement for carrying out movements thereof.

2. The selection system according to claim 1, wherein the toggle link of the toggle link arrangement is formed between two legs arranged to be rotatable relative to one another about a toggle link rotation axis, at a distance from the toggle link rotation axis, one of the legs is swivellably about a first leg rotating axis connected with the selector element and the other of the legs is swivellably about a second leg rotating axis connected with another element, the toggle link rotation axis and the two leg rotating axes being arranged parallel to one another, and the selector element being arranged to be movable relative to the additional element and at a right angle transversely to the rotation axes of the toggle link arrangement, so that the toggle angle and the positions of the legs change with adjusting movements of the selector element.

3. The selection system according to claim 1, wherein the actuator arrangement comprises has a positioning spring device which pushes the locking body in one moving direction into a defined position, and an electromagnetic driving device which, in a switched-on condition, pushes the locking body against the spring force of the positioning spring device, in an opposite moving direction, into another defined position.

4. The selection system according to claim 3, wherein the toggle link of the toggle link arrangement is formed between two legs arranged to be rotatable relative to one another about a toggle link rotation axis, at a distance from the toggle link rotation axis, one of the legs is swivellably about a first leg rotating axis connected with the selector element and the other of the legs is swivellably about a second leg rotating axis connected with another element, the toggle link rotation axis and the two leg rotating axes being arranged parallel to one another, and the selector element being arranged to be movable relative to the additional element and at a right angle transversely to the rotation axes of the toggle link arrangement, so that the toggle angle and the positions of the legs change with adjusting movements of the selector element.

5. The selection system according to claim 1, wherein a spring device is operatively arranged on the toggle link so as to load the toggle link by a spring force directed transversely to the legs and transversely to the toggle link rotation axis.

6. The selection system according to claim 1, wherein the selector element has a selector lever arranged to be swivellable about a selector lever rotation axis parallel to the rotation axes of the toggle link arrangement.

7. The selection system according to claim 6, wherein the selector lever rotation axis is the rotation axis of a transmission shifting shaft.

8. The selection system according to claim 7, wherein the selector element is rotatably arranged about the selector lever rotation axis and about a transverse rotation axis arranged at right angle transversely thereto, and the rotation axes of the toggle lever arrangement are parallel to one of the selector lever rotation axis and the transverse rotation axis.

9. The selection system according to claim 6, wherein the selector element is rotatably arranged about the selector lever rotation axis and about a transverse rotation axis arranged at right angle transversely thereto, and the rotation axes of the toggle lever arrangement are parallel to one of the selector lever rotation axis and the transverse rotation axis.

10. The selection system according to claim 1, wherein the moving path of the locking body extends in a plane situated at a right angle transversely to the rotation axes of the toggle lever arrangement.

11. The selection system according to claim 1, wherein the locking body is a detent pawl with at least one locking surface formed in an outer circumferential surface thereof.

12. The selection system according to claim 1, wherein the locking body is a locking gate with a locking gate window having window edges at which at least one locking surface is formed to be engaged and disengaged with the toggle lever arrangement.

13. The selection system according to claim 12, wherein the at least two locking surfaces are formed on mutually opposite window edges of the locking gate window.

14. The selection system according to claim 1, wherein the locking body has at least two spaced locking surfaces which point away from one another in the opposite direction and of which a locking position depends on a positioning of the selector element.

15. The selection system according to claim 14, wherein the at least two locking surfaces are formed on mutually opposite edges of a locking gate window.

16. The selection system according to claim 1, wherein the locking body is a camshaft arranged to be rotatable by the actuator arrangement.

* * * * *